United States Patent [19]

Åström et al.

[11] Patent Number: 5,631,934
[45] Date of Patent: May 20, 1997

[54] METHOD FOR ADAPTING DATA FLOWS

[75] Inventors: Hans L Åström, Mölndal; Kjell T. Magnusson, Askim, both of Sweden

[73] Assignee: Telefonaktiebolaget LM Ericsson, Stockholm, Sweden

[21] Appl. No.: 528,837

[22] Filed: Sep. 15, 1995

[30] Foreign Application Priority Data

Sep. 16, 1994 [SE] Sweden ............... 9403101-0

[51] Int. Cl.⁶ ............... H04L 7/00; H04L 25/36
[52] U.S. Cl. ............... 675/372; 370/428; 370/468; 375/377
[58] Field of Search ............... 375/372, 377; 370/13, 17, 79, 85.6, 84, 60, 61, 94.1; 371/32, 33; 358/404, 444

[56] References Cited

U.S. PATENT DOCUMENTS

| | | | |
|---|---|---|---|
| 5,132,966 | 7/1992 | Hayano et al. | 370/79 |
| 5,166,930 | 11/1992 | Braff et al. | 370/94.1 |
| 5,231,633 | 7/1993 | Hluchyj et al. | 370/94.1 |
| 5,233,606 | 8/1993 | Pashan et al. | 370/85.6 |
| 5,268,900 | 12/1993 | Hluchyj et al. | 370/85.6 |

FOREIGN PATENT DOCUMENTS

| | | |
|---|---|---|
| 3609430 | 9/1987 | Germany. |
| 59-181753 | 10/1984 | Japan. |
| 61-21644 | 1/1986 | Japan. |
| 2-242500 | 9/1990 | Japan. |
| 5-266392 | 10/1993 | Japan. |

Primary Examiner—Stephen Chin
Assistant Examiner—Don Vo
Attorney, Agent, or Firm—Burns, Doane, Swecker & Mathis

[57] ABSTRACT

A method adapts the amount of messages with a number of various identities transferred between a transmitter and a receiver. The transfer is accomplished in such a way that no essential information is lost even if the message rate from the transmitter exceeds the possible transfer rate. A data area is created in which each message with a certain identity is stored while awaiting to be transferred. When a new message with the same identity as an earlier stored message is supplied to the data area, the new message replaces the earlier stored message. The messages stored in the data area are scanned and are transferred to the receiver at a rate which is adapted to the rate possible for the transfer.

7 Claims, 3 Drawing Sheets

METHOD FOR ADAPTING DATA FLOWS

BACKGROUND

The present invention relates to a method for transferring information in a safe way, in a system having a limited transfer capacity, without losing essential information.

When transferring data it can happen that the influx of information to a process exceeds the capacity of the following transfer channel. The traditional solution to problems with uneven data flow is to have a queue between the two data flows. If the influx is greater than the outflux during a limited time then you try to estimate how large the queue will have to be to be able to hold all the information until the influx is smaller than the outflux and the queue can begin to be emptied. It is customary to overdimension the queue size to be able to be reasonably certain that the queue will be sufficiently large, which often results in very large queues. In addition to the difficulty of assessing how large the queue must be there is always the risk that an unpredicted event will take place for which the queue will be too small anyway, with the result being a random loss of information.

If the influx of information is always larger than the outflux there will be a random loss of essential information irrespective of any queues.

There are, however, cases when there is no need to transfer all the information from one link to another, e.g. radar surveillance for traffic control. The essential information is the supervised vehicles (ships, airplanes etc.) position at the actual time, i.e. the essential information is the last available, up-to-date, information and the older information has lost its value and is no longer of interest.

When using the conventional queuing method for solving the problems connected with uneven information flows in cases similar to these, there is always the danger that if the queue size has been incorrectly estimated in combination with unpredictable cases for which the queue is too small or when the influx is always larger than the outflux, the information which is lost can be the desirable essential last information as well as old and anyhow unwanted information.

The conventional queuing method for solving the problem is therefore not acceptable for a safe transfer of essential information. There is often a further demand that the information should be transferred in order of priority and be retransferred if no acknowledgement is obtained.

SUMMARY

One object of the invention is thus to provide a method through which a loss of essential information is avoided in situations where the influx of information to a process is greater than the outflux of information.

Additional objects of the invention are to make it possible to transfer the information in order of priority and that the safety of the transfer is guaranteed through a method of acknowledgement in which messages are retransferred if they are not acknowledged.

Said objects are achieved through a method according to the invention in which a data area is created, said area containing a number of places for information in the form of messages that are to be transferred. Incoming new messages, of the same kind as those already stored in the data area, replace the already stored message according to the principle "the most recent is valid". This gives the advantages of avoiding a large expensive queue which might still be too small, the calculation of the required memory is simplified, there is no need for guessing a worst case scenario etc.

To meet the demands for a safe transmission all new messages are provided with flags which are removed when the messages have been transferred and an acknowledgement has been obtained from the receiver of the information.

A transmission based on priority is obtained when each message is given a defined priority and the data area is scanned in order of priority.

Through this method a safe way of transferring information with priority between a transmitter and a receiver is obtained, with no loss of essential information and without using large message queues even when the amount of information from the transmitter may exceed the transfer capacity.

DETAILED DESCRIPTION

The invention will now be described with reference to FIGS. 1-5.

Figure 1:
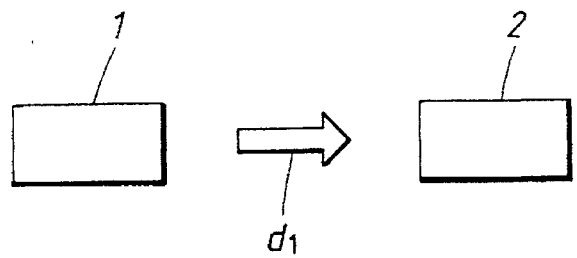
FIG. 1 shows a schematic diagram of the data flow between a transmitter and a receiver.

FIG. 1 shows in schematic form the problem the invention solves. From a transmitter/data source 1 a data flow d1 is to be transferred to a receiver 2. If the transfer capacity between the data source 1 and the receiver 2 is such that the maximum transferred data flow is d2 then problems will occur in those instances when d1>d2.

In many situations there is no explicit need for all the information from a data source. In many cases it is not even desirable that the receiver is burdened with all the information, when only the most recent (up-to-date) information is of interest.

Figure 2:
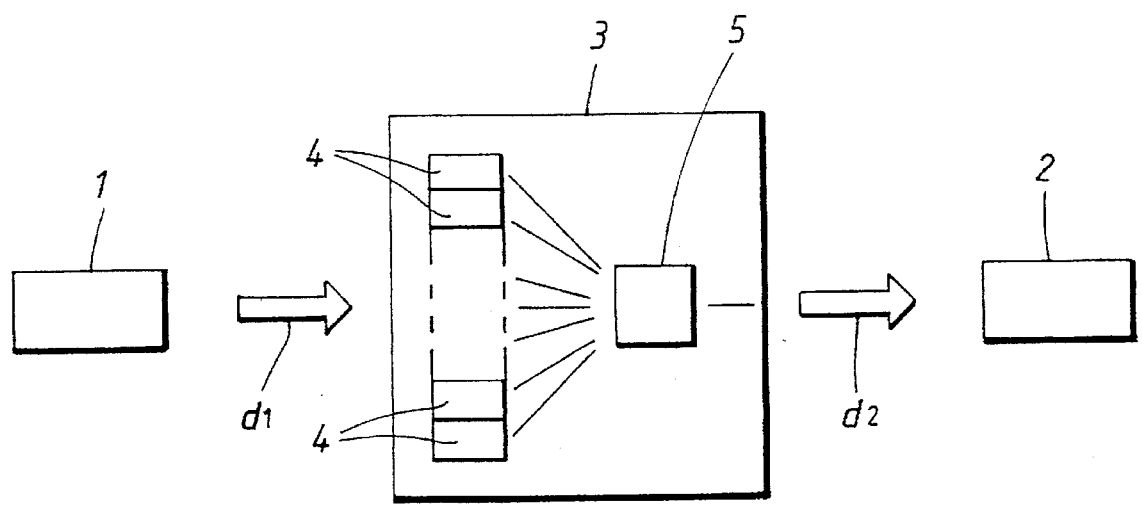
FIG. 2 shows a schematic diagram of the data flow between a transmitter and a receiver where an adaption of the data flow according to the invention is applied.
Figure 3:
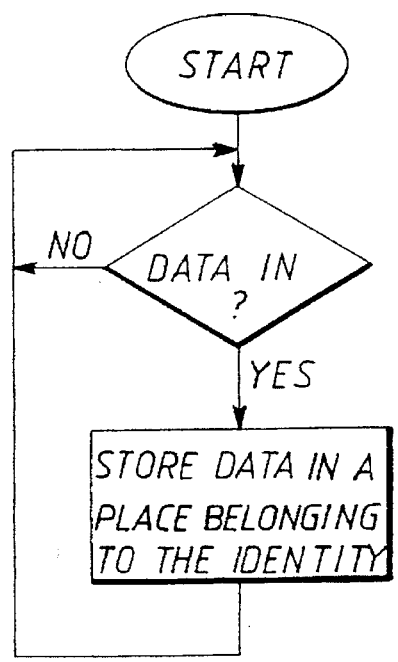
FIG. 3 shows a flow chart of the input of data into the data area according to a preferred embodiment of the invention.
Figure 4:
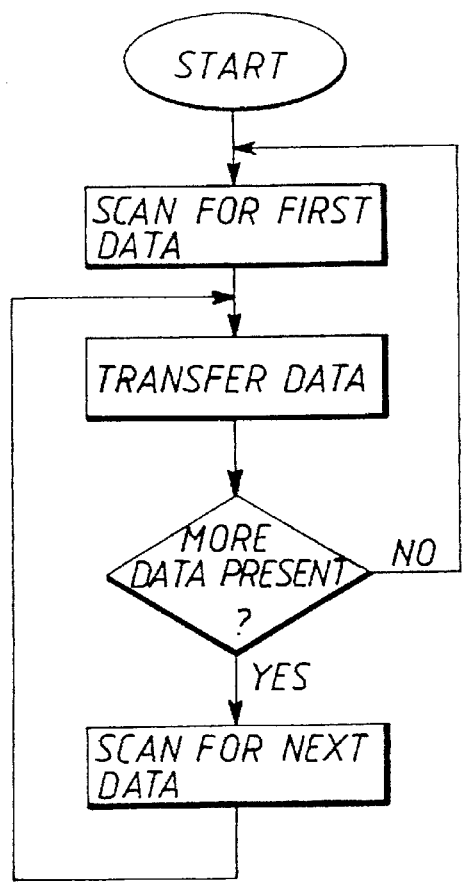
FIG. 4 shows a flow chart of the output of data from the data area according to a preferred embodiment of the invention.

To solve the problems concerning transferring information between different processes or units as stated above, the present invention discloses a method for adapting the data flow d1 to the available transfer capacity. This is shown in FIG. 2 where the designation 3 indicates the process which adapts the data flow d1 to the transfer capacity d2. According to the method this is done by creating a data area in which information is stored in a number of places whilst waiting to be transferred. The information in this context can be e.g. data messages, with a number of different identities, which are generated at a rate corresponding to the data flow d1. Each message with a certain identity then has its own space 4 in the data area. When new messages arrive, with the same identity as previously stored, the earlier message will be replaced according to the principle "the most recent is valid". A flow diagram describing this method of storage is found in FIG. 3.

The designation 5 indicates a process which, e.g. repeated sequentially, scans the data area and forwards the stored messages with a data rate at the most equal to the maximum data flow d2. A flow diagram describing this scanning and transfer method is found in FIG. 4.

To render the method even more effective and consequently increase the up-to-dateness of the information transferred to the next process or unit, it is possible to use "send" flags. This means that as soon as a new message is stored in the data area it is given a flag which indicates that it is ready to be transferred. The process 5 thus only looks for messages with flags set which means that only such information which has been updated will be sent. The flags are removed by the process 5 after the message has been sent.

To guarantee that the last available information has indeed been received by the receiver 2 the process 5 can be set up so that the flag is not removed until an acknowledgement has been obtained from the receiver.

Figure 5:
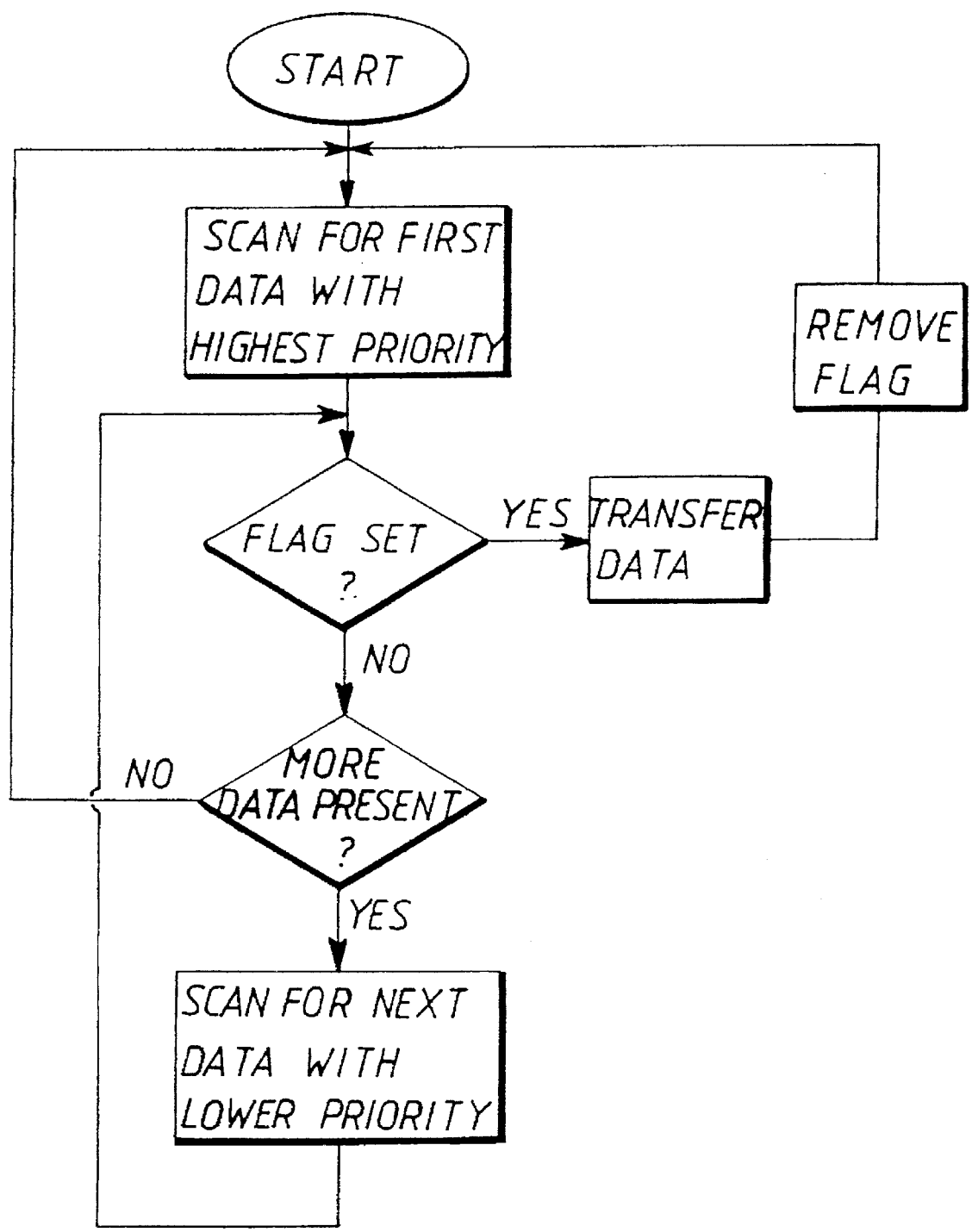
FIG. 5 shows a flow chart of the transfer of data from the data area using flags and transfer with priority according to a preferred embodiment of the invention.

Since different messages can be of greater or lesser importance it is often desirable to give priority to the transfer. The message identities are therefore divided or grouped into different types, where each type is given a certain priority. The transfer of messages in order of priority is then performed by the process 5 so that when it scans the data area for messages to be transferred, it begins with message types with the highest priority and when a message with a set flag is found, this message is sent, after which the scan through the data area for messages to transfer is restarted or continued. When no messages of the highest priority remain the scan continues amongst messages with decreasingly lower priority. FIG. 5 shows an example of a flow diagram where flags are used during the scanning and where the transfer is done with priority.

As will be evident from the embodiment described below, it is suitable to allocate only one place in the data area per type for certain types of message identities, whilst, for other types, it is necessary to use several places per type.

One example of an embodiment of the method according to the invention is for radar surveillance of air or sea traffic where information from a number of radar stations are transferred to a traffic control centre. The transferred information can be messages containing positional data for the objects tracked by the radar system. If several objects have to be tracked simultaneously, it is, of course, not suitable to store all objects in the same place in the data area where they will be written over each other. If the system is dimensioned to simultaneously track e.g. 50 objects, this type of message will then have to be assigned 50 different identities (objects) in the data area. Only one place per identity, on the other hand, is needed since only the latest received positional data from the radar system is essential. Each new piece of positional data for a certain object can thus replace previously stored data in the data area.

As an example of another type of message identity the current time can be mentioned. Only one piece of data, the latest, is of interest regarding this type, and therefore only requires a place for one identity in the data area.

When applying the method according to the invention to the described example it is e.g. possible to imagine that the flow of, inter alia, new positional data is so large that all cannot be transferred. The method, however, guarantees that when a piece of positional data is transferred, it is the last aquired and therefore the most up-to-date and essential piece of information. Even if certain previous positional data never was transferred, the up-to-date information will always be utilised for the transfer.

Through the possibility to, using the method, give priority to certain types of messages, it is quite possible to, at the time of transfer, give priority to the positional data of the objects before e.g. the less important current time.

The above description is to be seen as examples of different embodiments of the invention. The invention and its application is consequently not dependent on details in the flow charts shown in FIGS. 3–5. This is especially true regarding FIG. 5, since scanning for data of different priorities can be done in different ways without departing from the thought underlying the invention.

The invention is thus not restricted to the above described embodiments, but can be varied within the scope of the appended claims.

What is claimed is:

1. In a system in which information in the form of messages with a number of different identities is transferred between a transmitter and a receiver, a method of adapting a transferred amount of messages so that essential information is not lost even if a transfer rate from the transmitter exceeds a possible transfer rate to the receiver, comprising the steps of:

creating a data area in which each identity is allocated one place for storing messages;

storing messages with different identities separately while waiting to be transferred to the receiver;

when a new message with the same identity as a previously stored message is supplied to the data area, replacing the previously stored message with the new message;

scanning messages which are stored in the data area; and transferring the messages to the receiver at a transfer rate adapted to the possible rate of the receiver.

2. The method of claim 1, wherein the identities are grouped into different types, a first group of types having one identity per type, and a second group of types having a plurality of identities per type.

3. The method of claim 2, wherein each type of identity is given a priority which determines in what order the messages are transferred.

4. In a system in which information in the form of messages with a number of different identities is transferred between a transmitter and a receiver, a method of adapting a transferred amount of messages so that essential information is not lost even if a transfer rate from the transmitter exceeds a possible transfer rate to the receiver, comprising the steps of:

creating a data area in which each identity is allocated one place for storing messages;

storing messages with different identities separately while waiting to be transferred to the receiver;

when a new message with the same identity as a previously stored message is supplied to the data area, replacing the previously stored message with the new message, wherein when a new message replaces a previous message, the new message is given a flag which indicates that the message is ready to be transferred;

scanning messages which are stored in the data area; and transferring the messages to the receiver at a transfer rate adapted to the possible rate of the receiver.

5. The method of claim 4, wherein the data area is scanned with respect to flags and only those messages having flags are sent.

6. The method of claim 5, wherein when a message has been sent, an appurtenant flag is removed.

7. The method of claim 5, wherein when a message has been sent and an acknowledgement has been obtained from the receiver, an appurtenant flag is removed.

* * * * *